United States Patent
Weis et al.

(10) Patent No.: US 6,880,786 B2
(45) Date of Patent: Apr. 19, 2005

(54) STATIC LINE PARACHUTE AUTOMATIC ACTIVATION DEVICE

(75) Inventors: Brian J. Weis, Westchester, CA (US); Brian E. McCollough, Corona del Mar, CA (US); Marvin S. Stone, Rancho Palos Verdes, CA (US); Edward W. Maby, Redondo Beach, CA (US)

(73) Assignee: L.J. Engineering, Inc., Huntington Beach, CA (US)

( * ) Notice: Subject to any disclaimer, the term of this patent is extended or adjusted under 35 U.S.C. 154(b) by 0 days.

(21) Appl. No.: 10/428,305

(22) Filed: May 1, 2003

(65) Prior Publication Data

US 2004/0245398 A1 Dec. 9, 2004

(51) Int. Cl.$^7$ .............................................. B64D 17/54
(52) U.S. Cl. ................................................ 244/149
(58) Field of Search ............................. 244/147–150, 244/152

(56) References Cited

U.S. PATENT DOCUMENTS

| | | | | |
|---|---|---|---|---|
| 2,570,295 A | * | 10/1951 | Vantine, Jr. .................. | 244/150 |
| 3,437,295 A | * | 4/1969 | Istel et al. .................... | 244/148 |
| 3,547,383 A | * | 12/1970 | Carpenter, Jr. ............... | 244/150 |
| 3,667,705 A | * | 6/1972 | Snyder ......................... | 244/150 |
| 3,820,748 A | * | 6/1974 | McDonald .................... | 244/149 |
| 3,862,731 A | * | 1/1975 | McIntyre ...................... | 244/141 |
| 4,715,563 A | * | 12/1987 | Quamen ....................... | 244/152 |
| 4,858,856 A | | 8/1989 | Cloth | |
| 5,825,667 A | * | 10/1998 | Van Den Broek ........... | 702/141 |
| 5,881,974 A | * | 3/1999 | Larsen et al. ................ | 244/149 |
| 6,378,808 B1 | | 4/2002 | Smolders | |

* cited by examiner

*Primary Examiner*—Galen Barefoot
(74) *Attorney, Agent, or Firm*—Crowell & Moring LLP

(57) ABSTRACT

An apparatus and method to improve the safety of static line parachute jumping are disclosed. According to the method, a safety device situated on a jumper continuously or periodically senses the distance of the jumper from the jumping platform (e.g. an aircraft). The safety device compares this distance to a predetermined distance threshold. When the distance between the jumper and the jumping platform reaches or exceeds the predetermined distance threshold, the safety device enables the reserve parachute deployment device which automatically deploys the reserve parachute if at such time the jumper's rate-of-descent is at or greater than a predetermined rate-of-descent threshold. Thus, the apparatus enables its reserve parachute deployment portion when the jumper is at least a predetermined distance from the jumping platform.

24 Claims, 4 Drawing Sheets

STATIC LINE PARACHUTE AUTOMATIC ACTIVATION DEVICE

FIELD OF THE INVENTION

This invention relates generally to parachutes, and in particular, to an automatic activation device and method, useful for static line parachutes, which senses the distance between the jumper and the jumping platform to enable the reserve parachute automatic deployment system.

BACKGROUND OF THE INVENTION

Static line parachutes are typically employed for relatively low altitude jumping applications, such as below 1500 feet above ground level. A typical static line parachute system incorporates a mechanism (the static line) for automatic deployment of the primary parachute, because of the relatively low altitude. Such a mechanism is used as a means of increasing parachute deployment reliability because the jumper would otherwise have a very short time to manually deploy the primary parachute at a safe altitude.

FIG. 1 illustrates a diagram of an exemplary static line parachute device 100. The static line parachute device 100 comprises a static line 102, a deployment bag 104, a breakable textile loop 105, a canopy 106, a plurality of suspension lines 107 and risers 108, a pack tray 110, and a harness 112. The static line 102 has a first end for attachment to the jumping platform, such as an airplane, helicopter, etc., and a second end attached to the deployment bag 104. The deployment bag 104 is, in turn, tied to the apex of the canopy 06 using a breakable textile loop 105. The canopy 106 is, in turn, attached to the harness 112 by way of the plurality of suspension lines 107 and risers 108. The harness 112 is attached to the pack tray 110, and is used to securely attach the jumper to the parachute device 100.

In the non-deployed state, the deployment bag 104 encloses the canopy 106 and externally stows the suspension lines 107 in an orderly fashion to aid parachute deployment, which lines connect to the risers 108, all of which are tightly packed within the pack tray 110. In addition, in the non-deployed state a portion of the static line 102 is also situated within the pack tray 110 but external to the deployment bag 104. When the jumper departs from the jumping platform, the portion of the static line 102 inside the pack tray 110 begins to unstow from the pack tray 110. After the unstowing of the static line 102 is complete, the tension force on the static line 102 caused by one end being fixed to the jumping platform and the other end attached to the falling deployment bag 104, pulls the deployment bag 104, canopy 106, suspension lines 107 and risers 108 out from the inside of the pack tray 110. As the jumper continues to fall and the deployment bag 104, canopy 106, suspension lines 107, and risers 108 are fully extended, the tension on the breakable textile loop 105 increases to a point at which the breakable textile loop 105 breaks due to its low strength characteristics. The canopy 106, now fully extended outside of the pack tray 110, encounters aerodynamic drag which forces the canopy to fully inflate to an open condition, which, in turn, normally slows the rate-of-descent of the jumper to a safe level.

In the majority of static line jumps, the parachute deploys in the intended way as described above. However, there are cases where the parachute deploys in an irregular manner, and which can sometimes lead to injuries and even lethal results for the jumper. Some of these cases relate to malfunctions concerning the static line. For instance, one such case is referred to in the relevant art as a "towed jumper" which occurs when a jumper becomes tangled in the static line. In addition, other lines, such as the ruck sack lowering line can also get caught on the jumping platform, leading to a "towed jumper" malfunction. Another case is when the static line breaks ("broken static line"), for example, by rubbing against a sharp edge portion of the jumping platform while a towed jumper oscillates up and down due to varying aerodynamic forces. Sometimes, the static line of a towed jumper breaks by impact from a subsequent jumper exiting the jumping platform.

Other cases relate to malfunctions with the canopy and/or the suspension lines. For instance, one case relates to a "damaged canopy" caused, for example, by tears or broken suspension lines, which damage results in an excessive rate-of-descent. Additionally, another case concerns a "suspension line entanglement" which limits the parachute from being able to fully inflate, resulting again in an excessive rate-of-descent. Furthermore, another case deals with a "line over entanglement" where some suspension lines deploy improperly over the top of the canopy, resulting in inadequate, or limited inflation of two or more smaller canopies having reduced drag causing again an excessive rate-of-descent.

Most, if not all, static line parachutes have a reserve parachute in case malfunctions occur with the deployment of the primary parachute. However, in these existing static line parachutes, the reserve parachute must be deployed manually by the jumper. A problem with such a manually-deployable reserve system is that the jumper may be incapable of deploying the reserve parachute if, for example, he collides with another jumper and becomes unconscious. Another problem concerns the desire for jumps at lower exit altitudes. At such lower altitudes, the jumper may not have sufficient time to recognize a problem has occurred with the primary parachute, and react to subsequently deploy the reserve parachute at a safe altitude.

Other types of automatic activation devices are available for free-fall parachutes. They function by releasing a reserve parachute at a preset altitude when a jumper's rate of descent exceeds a preset speed. Typically, these devices function based on an atmospheric pressure corresponding to the preset activation altitude and calculated in relation to the expected ground pressure where the jumpers will land. Dynamic pressure disturbances, which occur as a jumper exits the aircraft, can be as much as the equivalent of a 400-foot altitude change, depending on the aircraft speed, direction of the pressure sensor relative to the wind, and other parameters. Consequently, these types of free-fall automatic activation devices typically require a minimum altitude of 1,500 feet or more between the exit altitude and the ground to enable the device to function properly. Such requirements prevent using free-fall devices for static line parachute applications at low exit altitudes.

Thus, there is a need for a new system and method to improve the safety of static line parachute jumping. Such need and others are met with the static line parachute automatic actuation devices and related methods as described herein in accordance with the invention.

SUMMARY OF THE INVENTION

A general concept of the invention relates to a method to improve the safety of static line parachute jumping. According to the method, a safety device situated on a jumper continuously or periodically senses the distance of the jumper from the jumping platform (e.g. an aircraft). The safety device compares this distance to a predetermined distance threshold. When the distance between the jumper and the jumping platform reaches or exceeds the predetermined distance threshold, the safety device enables the reserve parachute deployment device, which automatically deploys the reserve parachute if at such time the jumper's rate-of-descent is at or greater than a predetermined rate-of-descent threshold. Thus, a general concept of the invention is the enabling of the reserve parachute deployment system when the jumper is at least at a predetermined distance from the jumping platform.

A second aspect of the invention relates to a method of deploying a reserve parachute, comprising determining whether a distance between a jumper and a jumping platform is at or greater than a predetermined distance threshold, if the distance is at or greater than the predetermined distance threshold, determining whether a rate-of-descent of the jumper is at or greater than a predetermined rate-of-descent threshold, and deploying the reserve parachute if the rate-of-descent of the jumper is at or greater than the predetermined rate-of-descent threshold.

A third aspect of the invention relates to an apparatus for automatically deploying a reserve parachute, comprising a first circuit to generate a first parameter indicative of a distance between a jumper and a jumping platform; a second circuit to generate a second parameter indicative of a rate-of-descent of the jumper; a third circuit to deploy the reserve parachute if the second parameter indicates that the rate-of-descent of the jumper is at or greater than a predetermined rate-of-descent; and a fourth circuit to enable the third circuit if the first parameter indicates that the distance between the jumper and the jumping platform is at or greater than a predetermined distance threshold.

A fourth aspect of the invention relates to a parachute equipment comprising a primary parachute; a reserve parachute; and an apparatus for automatically deploying a reserve parachute. The automatic reserve parachute deployment apparatus, in turn, comprises a first circuit to generate a first parameter indicative of a distance between a jumper and a jumping platform; a second circuit to generate a second parameter indicative of a rate-of-descent of the jumper; a third circuit to deploy the reserve parachute if the second parameter indicates that the rate-of-descent of the jumper is at or greater than a predetermined rate-of-descent; and a fourth circuit to enable the third circuit if the first parameter indicates that the distance between the jumper and the jumping platform is at or greater than a predetermined distance threshold.

Other aspects, features and techniques of the invention will become apparent to one skilled in the relevant art in view of the following detailed description of the invention.

DETAILED DESCRIPTION OF THE INVENTION

A general concept of the invention relates to a method to improve the safety of static line parachute jumping. According to the method, a safety device situated on a jumper continuously or periodically senses the distance of the jumper from the jumping platform (e.g. an aircraft). The safety device compares this distance to a predetermined distance threshold. When the distance between the jumper and the jumping platform reaches or exceeds the predetermined distance threshold, the safety device enables the reserve parachute deployment device which automatically deploys the reserve parachute if after such time the jumper's rate-of-descent is at or greater than a predetermined rate-of-descent threshold. Thus, a general concept of the invention is the enabling of the reserve parachute deployment system when the jumper is at least at a predetermined distance from the jumping platform.

The predetermined distance threshold is chosen to be greater than the maximum distance the jumper could be in a towing situation. A towing situation occurs when the static line fails to separate at the breakable fabric loop, and consequently the aircraft is essentially towing the jumper. In a towing situation, it is not desirable for the reserve parachute to deploy since towing may be a result of the static line being wrapped around the jumper's body and forces resulting from deploying a reserve parachute would severely injure the jumper. Thus, if the distance of the jumper from the aircraft is greater than the predetermined distance threshold, it is assumed that the jumper is not in a towing situation, and thus enabling the reserve parachute deployment sensing system would be appropriate. The maximum distance from the jumper to the aircraft in a towing situation occurs when the static line, deployment bag, canopy, suspension lines, and risers are fully extended. This maximum distance could be about 50 feet. If such is the case, the predetermined distance threshold is set at or greater than the maximum distance between the jumper and the aircraft in a towing situation.

The predetermined rate-of-descent threshold is chosen to be just greater than the maximum rate-of-descent of a normally functioning parachute. Accordingly, if the jumper's rate-of-descent is slower than the predetermined rate-of-descent threshold, meaning that the jumper's rate-of-descent is normal, the safety device does not automatically deploy the reserve parachute. Inadvertent deployment of a reserve parachute is undesirable, since there is a chance it may become tangled with the deployed primary parachute, which entanglement could cause both parachutes to collapse. On the other hand, if the jumper's rate-of-descent is faster than the predetermined rate-of-descent, meaning that the jumper's rate-of-descent is excessive, the safety device automatically deploys the reserve parachute. This concept will be explained in more detail with reference to the following exemplary embodiments.

Figure 1:
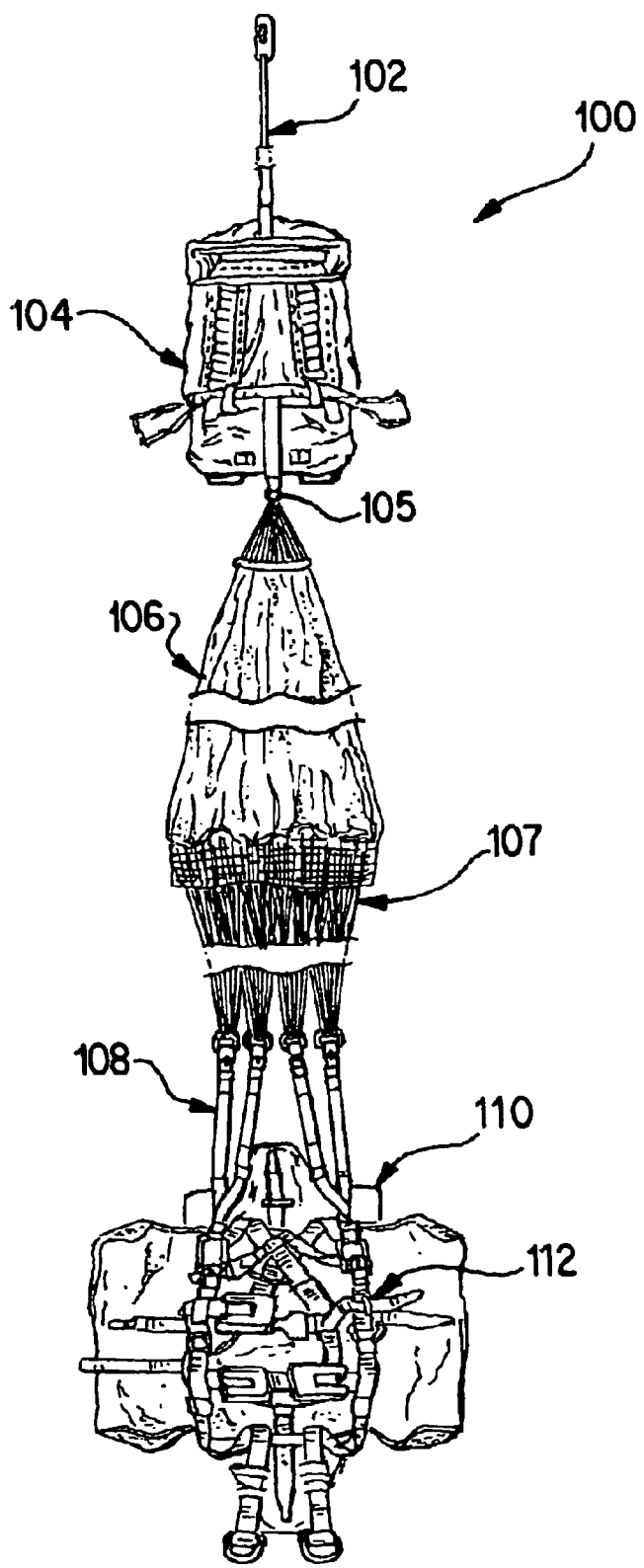
FIG. 1 illustrates a diagram of an exemplary static line parachute device.
Figure 2:
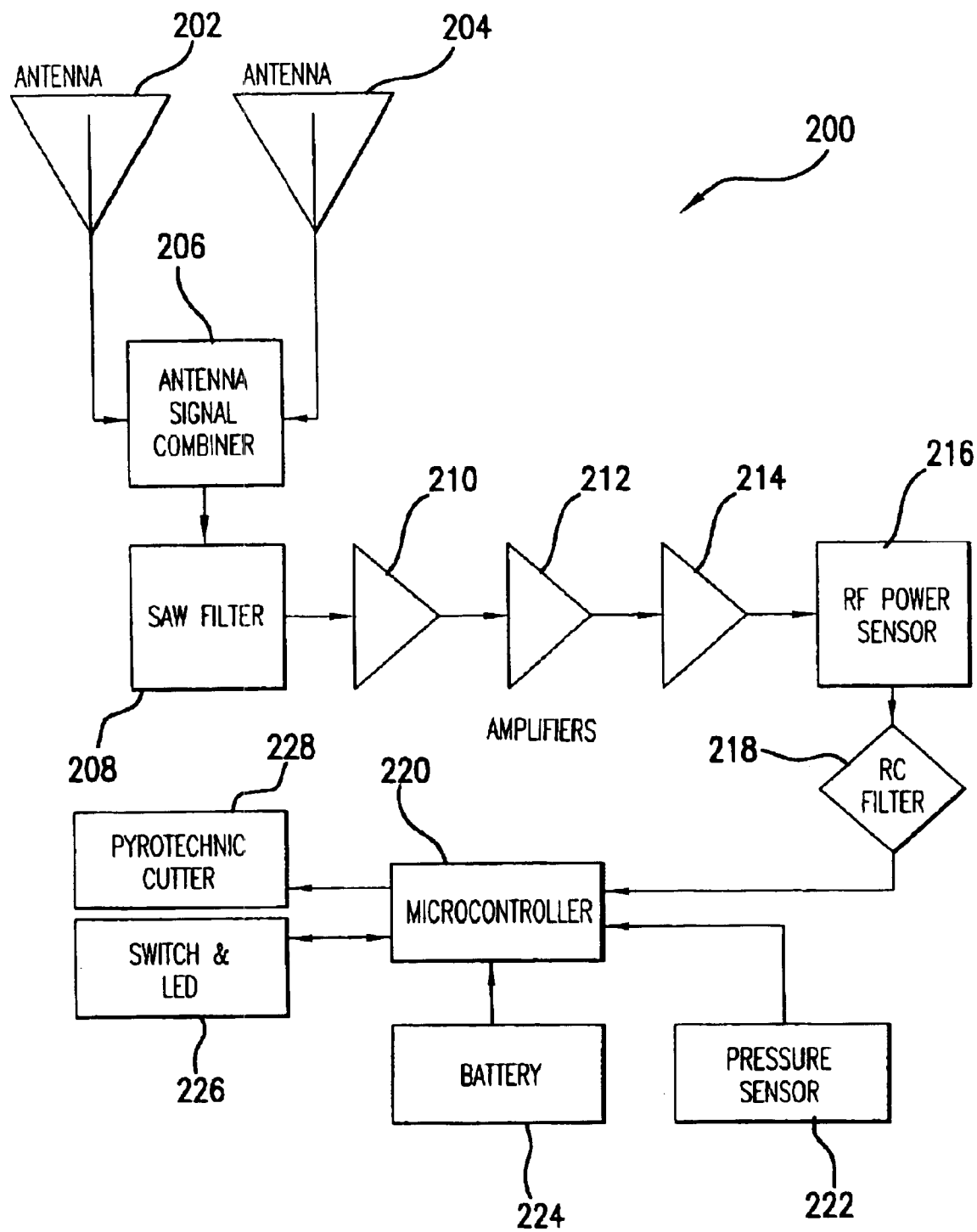
FIG. 2 illustrates a block diagram of a safety device in accordance with an embodiment of the invention.

FIG. 2 illustrates a block diagram of a parachute safety device 200 in accordance with another embodiment of the invention. As discussed above, a general concept of the invention is to measure the distance between the jumper and the jumping platform, and enable the reserve parachute deployment system when that distance is at or greater than the predetermined distance threshold. In the exemplary embodiment, the measurement of the distance between the jumper and the jumping platform is performed by having a radio frequency (RF) transmitter on the jumping platform transmit a signal having a predetermined power level upon leaving the transmitter, and the parachute safety device 200 on the parachute equipment 100 receive the signal. The power of the signal at the safety device 200 is a function of the distance between the jumper and the jumping platform. Thus, by measuring the power of the received signal, the safety device 200 can determine such a distance.

More specifically, the parachute safety device 200 comprises one or more antennas 202 and 204, a signal combiner 206, a surface acoustic wave (SAW) filter 208, one or more amplification stages 210, 212, and 214, a power sensor 216, a filter 218, a microcontroller 220, a pressure sensor 222, a battery 224, a switch and light emitting diode (LED) device 226, and a pyrotechnic cutter 228. The antennas 202 and 204 pick up the signal transmitted from the jumping platform. Although a single antenna could suffice, a pair of antennas positioned at different locations on the jumper, such as in front and in back of the jumper, is used to better pick up the emitted signal. The signal combiner 206, being electrically coupled to the antennas 202 and 204, combines the received signal from each antenna to form a total received signal. The SAW filter 208, being coupled to the output of the signal combiner 206, receives and filters the total received signal to remove undesired signals that were picked up by the antennas 202 and 204.

The one or more amplification stages 210, 212, and 214, being coupled to the output of the SAW filter 208, amplifies the filtered signal. The power sensor 216, being coupled to the output of the last amplification stage 214, converts the amplified signal to a power-indicating signal (e.g. a voltage) which indicates the power level of the received signal. The filter 218, being coupled to the output of the power sensor 216, smoothes dynamic changes in the signal produced by the power sensor 216. The microcontroller 220, being coupled to the output of the filter 218, receives the power-indicating signal. Since the power-indicating signal is inversely related to the distance between the jumper and the jumping platform, the microcontroller 220 uses the power indicating signal to determine when to enable the reserve parachute deployment system.

Figure 3:
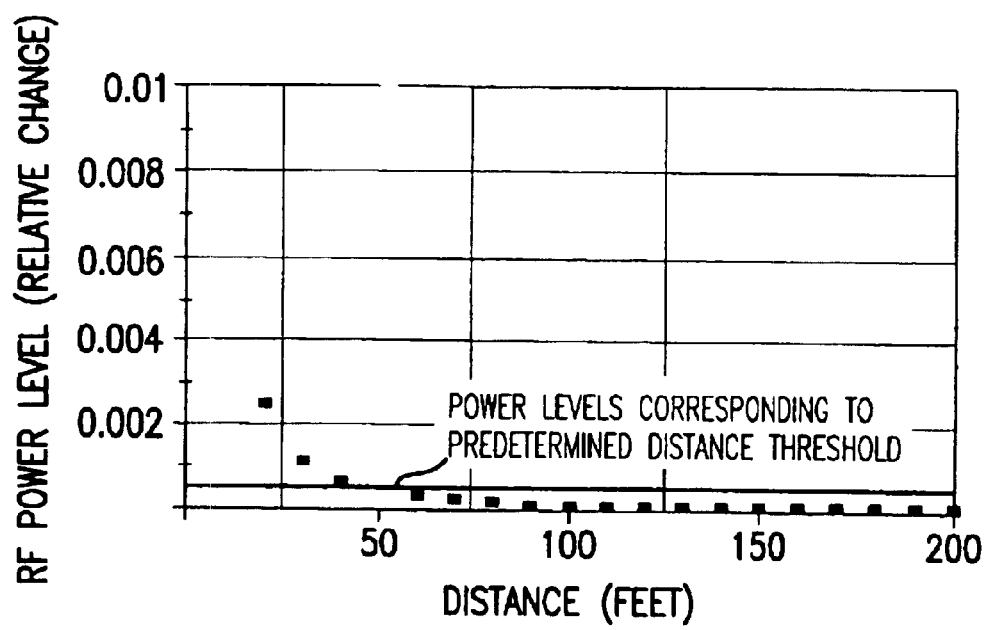
FIG. 3 illustrates an exemplary graph showing the relationship between the power level of the received signal to the distance between the jumper and the jumping platform.

FIG. 3 illustrates an exemplary graph showing the relationship between the power level of the received signal and the distance between the jumper and the jumping platform. As the graph illustrates, the power level of the signal received is essentially inversely related to the second power of the distance between the jumper and the jumping platform. The microcontroller 220 can use the power level of the received signal which indicates the distance between the jumper and the jumping platform to determine when to arm the reserve parachute deployment system. For example, shown in the graph is a horizontal line representing the power level corresponding to the predetermined distance threshold. Thus, when the microcontroller 220 senses that the power level of the received signal is at or below the power level corresponding to the predetermined distance threshold (e.g. 50 feet), the microcontroller 220 enables the automatic reserve parachute deployment portion of the safety device 200, as discussed below.

Referring back to FIG. 2, if the microcontroller 220 determines that the power level of the received signal is at or below the power level corresponding to the predetermined distance threshold, the microcontroller 220 after a predetermined time delay senses the signal generated by the pressure sensor 222, which over time is indicative of the rate-of-descent of the jumper. The microcontroller 222 compares the rate-of-descent of the jumper as indicated by the rate of change of the pressure sensor signal to the predetermined rate-of-descent threshold. If the microcontroller 220 determines that the rate-of-descent of the jumper is slower than the predetermined rate-of-descent threshold, the microcontroller 220 continues to monitor the pressure sensor signal. If, however, the microcontroller 220 determines that the rate-of-descent of the jumper is at or greater than the pre-determined rate-of-descent, the microcontroller 220 activates the pyrotechnic cutter 228 which causes the deployment of the reserve parachute. The battery 224 supplies direct current (DC) power to the microcontroller 220 and the switch and LED 226 are used to turn the system on and off, and to indicate whether the safety device is receiving signal.

In summary, when the jumper leaves the jumping platform, the microcontroller 220 of the parachute safety device 200 continuously or periodically compares the distance between the jumper and the jumping platform as indicated by the received signal to the predetermined distance threshold. When the microcontroller 200 determines that the measured distance is at or greater than the predetermined distance threshold (meaning that the jumper is not in a "towed jumper" situation) and after a predetermined time delay, the microcontroller 220 begins to compare the rate-of-descent of the jumper as measured by changes over time of the pressure sensor signal to the predetermined rate-of-descent threshold. When the microcontroller 220 determines that the measured rate-of-descent of the jumper is at or greater than the predetermined rate-of-descent threshold (meaning that there is a problem with the primary parachute), the microcontroller 220 activates the pyrotechnic cutter 228 to cause the deployment of the reserve parachute.

Figure 4:
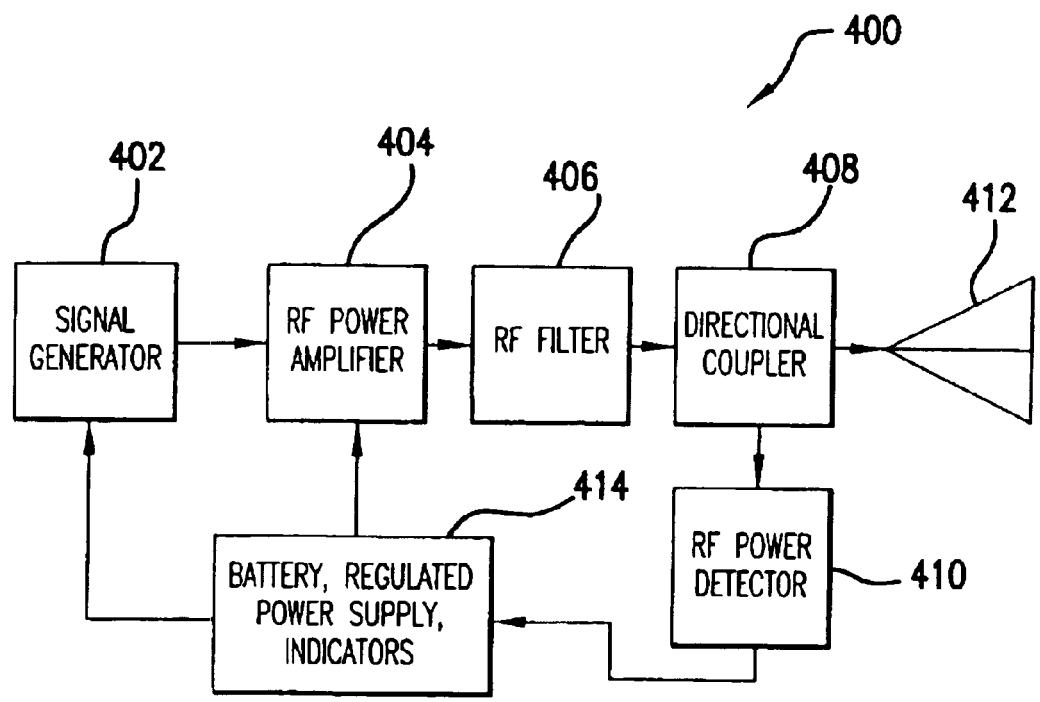
FIG. 4 illustrates a block diagram of an exemplary transmitter unit in accordance with another embodiment of the invention.

FIG. 4 illustrates a block diagram of an exemplary transmitter unit 400 in accordance with another embodiment of the invention. As previously discussed, the transmitter unit 400 is located on the jumping platform (e.g. an aircraft) and produces the signal used by the parachute safety device 200 in determining the distance between the jumper and the jumping platform. The transmitter unit 400 comprises a signal generator 402, a power amplifier 404, a filter 406, a directional coupler 408, a power detector 410, an antenna 412, and a power supply 414 including a regulator responsive to the signal generated by the power detector 410. The signal generator 402 produces a periodic signal, such as a sinusoidal signal. The power amplifier 404, being coupled to the output of the signal generator 402, amplifies the periodic signal. The filter 406, being coupled to the output of the power amplifier 404, removes unwanted signal components such as noise, spurs, harmonics, etc. from the periodic signal.

The coupler 408 generates a sampled portion of the amplified periodic signal. The antenna 412 converts the periodic signal into electromagnetic signals which radiate in free space. The power detector 410, being coupled to the coupled port of the directional coupler 408, produces a signal proportional to the periodic signal from the directional coupler 408. The regulated power supply 414 biases the signal generator 402 and/or the power amplifier 404 to maintain the power level of the periodic signal substantially constant at the input to the antenna 412. Since the power of the signal received by the parachute safety device 200 is used to determine the distance between the jumper and the jumping platform, the transmitter unit 400 should output a signal having a substantially constant power level.

Figure 5:
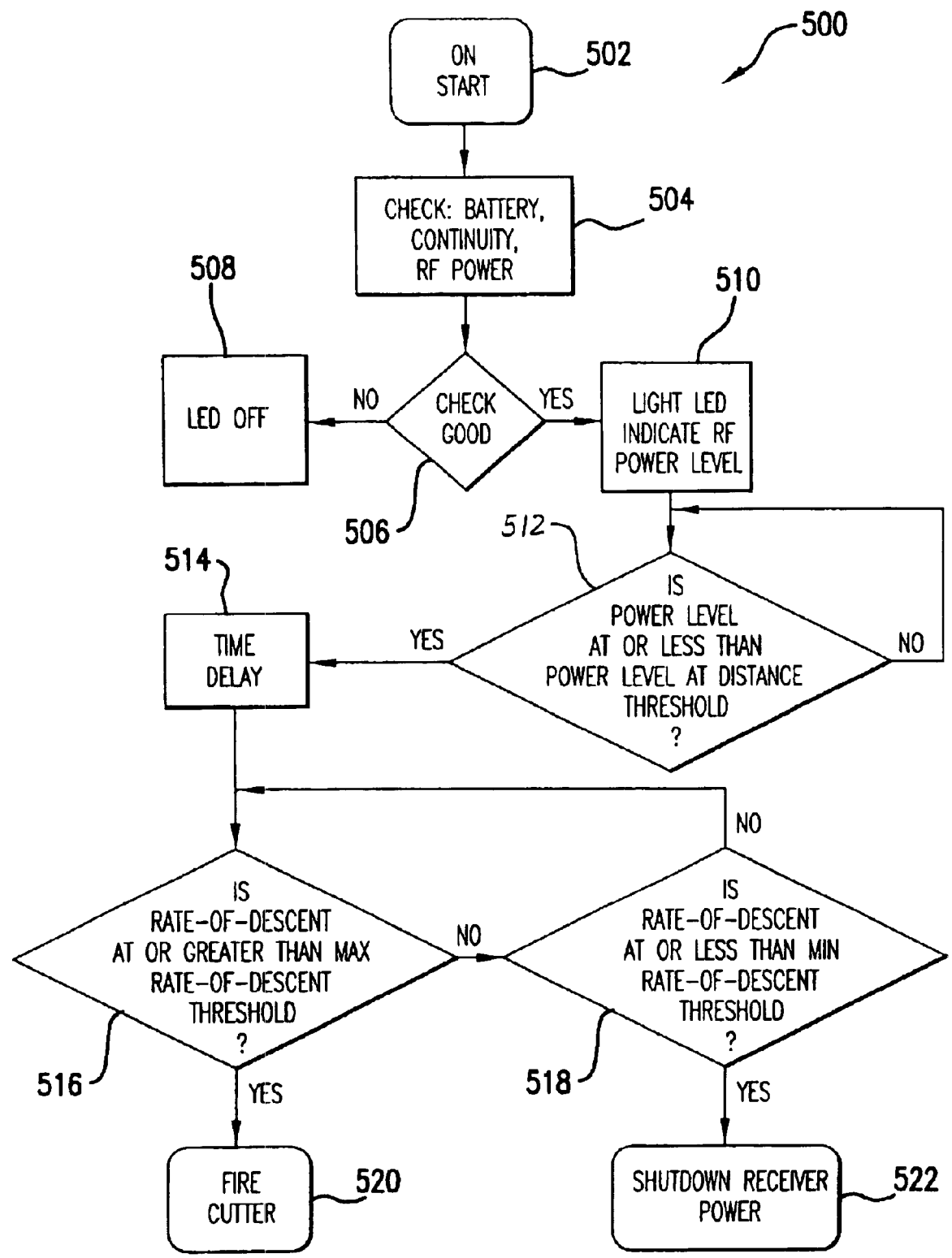
FIG. 5 illustrates a flow diagram of an exemplary method performed by the safety device in accordance with another embodiment of the invention.

FIG. 5 illustrates a flow diagram of an exemplary method 500 performed by the parachute safety device 200 in accordance with another embodiment of the invention. According to the method 500, the parachute safety device 200 is first activated (block 502). Next, a determination is made as to whether there is sufficient battery power to operate the safety device 200 and whether the safety device 200 is capable of receiving sufficient signal power from the transmitter on the jumping platform (blocks 504 and 506). If it is determined that there is insufficient battery power to operate the safety device 200 and/or that safety device 200 is incapable of receiving sufficient signal power from the transmitter, the LED 226 remains off (block 508). If, however, the microcontroller 220 determines that there is sufficient battery and signal power, it activates the LED 226 (block 510).

Next, the microcontroller 220 continuously or periodically monitors the power level of the received signal to determine whether the power level is at or greater than the power level corresponding to the predetermined distance threshold (block 512). If the microcontroller 220 determines that the signal power level is greater than the power level corresponding to the predetermined distance threshold, the microcontroller 220 continues to monitor the signal power level. If, on the other hand, the microcontroller 220 determines that the signal power level is at or less than the power level corresponding to the predetermined distance threshold (meaning that the jumper has passed the maximum "towed jumper" distance), the microcontroller 220 waits a predetermined time delay before taking action (block 514). The time delay allows time for the primary parachute to fully inflate.

After waiting the predetermined time delay, the microcontroller 220 then monitors the signal generated by the pressure sensor 222 to determine whether the rate-of-descent of the jumper is at or greater than the predetermined rate-of-descent threshold (block 516). If the microcontroller 220 determines that the rate-of-descent of the jumper is at or greater than the predetermined rate-of-descent threshold (meaning that the jumper's rate-of-descent exceeds that of a normal primary parachute), the microcontroller 220 activates the pyrotechnic cutter 228 to cause the deployment of the reserve parachute (block 520). If, on the other hand, the microcontroller 220 determines that the rate-of-descent of the jumper is less than the predetermined rate-of-descent threshold, the microcontroller 220 also determines whether the rate-of-descent of the jumper is at or below a minimum rate-of-descent threshold (block 518). If the microcontroller 220 determines that rate-of-descent of the jumper is at or below the minimum rate-of-descent threshold (meaning that the jumper has landed on the ground), the microcontroller 220 causes the parachute safety device 200 to shut down (block 522). Otherwise, the microcontroller 220 continues to monitor the pressure sensor signal (block 516).

In the exemplary embodiments described above, the measurement of the distance between the jumper and the jumping platform is performed by monitoring the power level of a signal transmitted by a transmitter located at the jumping platform. The measurement of the distance, however, can be performed in many other ways. In addition, the measurement of the jumper's rate-of-descent need not be performed using a pressure sensor; other devices and ways of sensing the jumper's rate-of-descent may be employed. Additionally, the device for causing the deployment of the reserve parachute need not be a pyrotechnic cutter; other devices for performing such function can also be employed.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It is claimed:

1. A method of deploying a reserve parachute, comprising:
   determining whether a distance between a jumper and a jumping platform is at or greater than a predetermined distance threshold;
   if said distance is at or greater than said predetermined distance threshold, determining whether a rate-of-descent of said jumper is at or greater than a predetermined rate-of-descent threshold; and
   deploying said reserve parachute if said rate-of-descent of said jumper is at or greater than said predetermined rate-of-descent threshold.

2. The method of claim 1, wherein determining whether said distance is at or greater than said predetermined distance threshold comprises:
   receiving a signal transmitted from said jumping platform; and
   determining whether a power level of said received signal is at or less than a predetermined power level corresponding to said predetermined distance threshold.

3. The method of claim 1, wherein determining whether said distance is at or greater than said predetermined distance threshold comprises:
   receiving a signal transmitted from said jumping platform;
   generating a voltage related to a power level of said signal; and
   determining whether said voltage is less than a predetermined voltage corresponding to said predetermined distance threshold.

4. The method of claim 1, wherein determining whether said distance is at or greater than said predetermined distance threshold comprises:
   receiving a signal transmitted from said jumping platform by way of one or more antennas;
   amplifying said signal;
   forming a voltage related to a power level of said amplified signal;
   determining whether said voltage is less than a predetermined voltage corresponding to said predetermined distance threshold.

5. The method of claim 1, wherein determining whether said rate-of-descent of said jumper is at or greater than said predetermined rate-of-descent threshold comprises:
   receiving a second signal from a pressure sensing device used to determine said rate-of-descent of said jumper; and
   comparing said second signal to a parameter corresponding to said predetermined rate-of-descent threshold.

6. The method of claim 1, wherein deploying said reserve parachute comprises activating one or more pyrotechnic cutters.

7. The method of claim 1, further comprising delaying said determination of whether said rate-of-descent of said jumper is at or greater than said predetermined rate-of-descent, a predetermined time interval after it is determined that said distance is at or greater than said predetermined distance threshold.

8. The method of claim 1, further comprising ceasing said determination of whether said rate-of-descent of said jumper is at or greater than said predetermined rate-of-descent threshold if said rate-of-descent of said jumper is at or less than a second predetermined rate-of-descent threshold.

9. The method of claim 1, wherein said jumping platform comprises an aircraft.

10. An apparatus for automatically deploying a reserve parachute, comprising:
- a first circuit to generate a first parameter indicative of a distance between a jumper and a jumping platform;
- a second circuit to generate a second parameter indicative of a rate-of-descent of said jumper;
- a third circuit to deploy said reserve parachute if said second parameter indicates that said rate-of-descent of said jumper is at or greater than a predetermined rate-of-descent threshold; and
- a fourth circuit to enable said third circuit if said first parameter indicates that the distance between the jumper and the jumping platform is at or greater than a predetermined distance threshold.

11. The apparatus of claim 10, wherein said first circuit comprises:
- an antenna to receive a signal from a transmitter located on a jumping platform;
- an amplifier to amplify said signal; and
- a power sensor to generate said first parameter from said amplified signal, wherein said first parameter comprises a voltage having an amplitude related to a power level of said received signal.

12. The apparatus of claim 11, further comprising a filter to smooth dynamic changes in said first parameter.

13. The apparatus of claim 11, wherein said amplifier comprises a plurality of amplification stages.

14. The apparatus of claim 11, further comprising a filter to remove unwanted signal components from said received signal.

15. The apparatus of claim 14, wherein said filter comprises a SAW filter.

16. The apparatus of claim 10, wherein said first circuit comprises:
- a plurality of antennas to receive a signal from a transmitter located on a jumping platform;
- a signal combiner to form a composite signal from signals generated by said antennas;
- an amplifier to amplify said composite signal; and
- a power sensor to generate said first parameter from said amplified composite signal, wherein said first parameter comprises a voltage having an amplitude related to a power level of said received signal.

17. The apparatus of claim 10, wherein said third circuit comprises a microcontroller to compare said second parameter to said predetermined rate-of-descent threshold.

18. The apparatus of claim 17, wherein said microcontroller causes a deployment of said reserve parachute.

19. The apparatus of claim 10, wherein said second circuit comprises a pressure sensor.

20. The apparatus of claim 10, wherein said fourth circuit comprises a microcontroller to compare said first parameter to said predetermined distance threshold.

21. The apparatus of claim 10, wherein said third circuit comprises one or more pyrotechnic cutters.

22. The apparatus of claim 10, further comprising a fifth circuit to disable said third circuit if said second parameter indicates that said rate-of-descent of said jumper is at or less than a minimum predetermined rate-of-descent threshold.

23. A parachute equipment comprising:
- a primary parachute;
- a reserve parachute; and
- an apparatus for automatically deploying a reserve parachute, comprising:
  - a first circuit to generate a first parameter indicative of a distance between a jumper and a jumping platform;
  - a second circuit to generate a second parameter indicative of a rate-of-descent of said jumper;
  - a third circuit to deploy said reserve parachute if said second parameter indicates that said rate-of-descent of said jumper is at or greater than a predetermined rate-of-descent threshold; and
  - a fourth circuit to enable said third circuit if said first parameter indicates that the distance between the jumper and the jumping platform is at or greater than a predetermined distance threshold.

24. The parachute equipment of claim 23, further comprising a fifth circuit to disable said third circuit if said second parameter indicates that said rate-of-descent of said jumper is at or less than a minimum predetermined rate-of-descent threshold.

* * * * *